United States Patent Office 3,257,219
Patented June 21, 1966

3,257,219
HIGH-ALUMINA CEMENT
Alexander Klein, 351 La Questa Drive, Danville, Calif.
No Drawing. Filed Nov. 1, 1962, Ser. No. 234,837
3 Claims. (Cl. 106—104)

The invention relates to the manufacture of high-alumina cement containing as its essential cementing ingredient calcium aluminates wherein CaO and $Al_2O_3$ occur in the molecular ratio of between about 1:1.1 and 3:5 and having the properties of high early strength when used as the cementing ingredient of motar or concrete, and suitability for use as a refractory cement.

Calcium aluminate cements having lime-to-alumina ratios in the above-stated range have heretofore been costly to manufacture and the known manufacturing methods have not fully developed their potential characteristics of very high early strength and resistance of the hardened mass of mortar or concrete in which they act as the binder against high temperature. Further, known cements having such lime-to-alumina ratios have had the disadvantage of setting rapidly when ground to a high degree of fineness, making it difficult to emplace the wet concrete or to transport them in ready-mix operations without the inclusion of costly retarders.

Continuous processes for their manufacture, using rotary kilns of the type used in the manufacture of ordinary (low-alumina) Portland cement, wherein the charge of calcareous and aluminous ores was fused, have been impracticable for the production of high-alumina cements due to the adherence of the fused materials to the kiln wall; further, they have produced cements lacking the optimum properties. All commercially used methods for producing such high-alumina cements have, therefore, been batch processes, wherein the charge was heated to above its fusion temperature within a vessel. Such processes are expensive.

Attempts have also been made to avoid the adherence of the fused mass to the kiln wall by using temperatures below fusion. For example, Roche (U.S. Patent No. 1,689,891) proposed burning lime and bauxite for 9–12 hours in a rotary kiln at 900° to 1000° C. Due to the very long reaction period this is, in effect, a batch process and is quite costly.

It has also been proposed to facilitate the reaction by producing the high-alumina cement as a co-product with other substances. For example, Peacock (U.S. Patent No. 1,000,290) proposed the inclusion of phosphate rock in a charge which was passed through a rotary kiln at temperatures below the fusion temperature of the charge. However, the cements produced in such a process contain deleterious amounts of phosphorus; also, the maximum strength characteristics of high-alumina cement are not attained.

On the other hand, fluxing has been attempted to improve passage of the charge through the kiln. An example is the proposal of Meyers (U.S. Patent No. 1,613,328) wherein alunite is a charge ingredient and potash is a by-product. Again, the reacting charge is fused and the potential strength and refractory properties of the high-alumina cement are not realized.

As will appear hereinafter, the characteristics of the cement depend, among other factors, on the chemical composition of the calcium aluminate and this is significantly influenced by the conditions at which it is prepared.

Further, prior high-alumina cements have not developed the desirable property of thixotropy; when present, they were destroyed upon mixing the mortars or concretes of which they formed a part for any extended period due to their tendency to set rapidly.

It is the principal object of this invention to provide a method of manufacturing high-alumina cement which method is economical and produces cement which is superior to those heretofore produced with respect to strength and/or refractory properties.

A further object is to provide a method of manufacturing high-alumina cement which produces cement combining the characteristics of high early-strength and slow set, whereby the cement can be ground to the optimum degree of fineness for developing its early strength and mortar or concrete containing the cement can be mixed for a desired period of time to permit low water-to-cement ratios to be used and/or to permit ready-mix operations and transport of wet mortar and concrete without either the danger of setting or recourse to admixtures for retarding the set. A related object is to produce a high-alumina cement having improved thixotropic properties.

In summary, according to the invention a charge which contains calcareous and aluminous ores, in proportion to yield calcium aluminate containing between 0.5 and 0.3 parts by weight of CaO to one part of $Al_2O_3$, is passed continuously through a flame-heated rotary kiln at a rate to attain a residence time of between about one and two and one-half hours within the kiln, the temperature being controlled to heat the charge to between 2000° and 2800° F., preferably below 2600° F., and always below the fusion temperature of the charge, the heating and rate of passage being controlled so that the charge is at a temperature above 1900° F., for a period between ten and sixty minutes; the calcined product is discharged from the kiln and ground to the form of a powder. The molecular weight ratio of calcium oxide to alumina in the calcium aluminate produced is between about 1:1.1 and 3:5.

The ores charged to the kiln should be free from such quantities of deleterious substances as would cause the cement product to contain amounts thereof sufficient to diminish the desirable properties of the cement significantly. In particular, the ore should contain not over 3% by weight of phosphates, reckoned as $P_2O_5$, and preferably less than 0.5%, to avoid the presence in the finally produced cement of phosphorus compounds in amount to decrease the strength of the strength of the cement significantly.

The above-stated ratio of calcium oxide to alumina to be yielded by the charged mixture of ores is the ratio of these components actually available for forming calcium aluminates, after portions of these constituents are removed from availability by other reactants or binding constituents present in the ores. For example, silicon and iron react or combine with calcium to form compounds or complexes (not fully known) and thereby abstract some of the calcium supplied to form principally $Ca_3SiO_5$ or $Ca_2SiO_4$, depending on the temperature of burning, and iron compounds or combinations which contain one or more mols of calcium for each mol of $Fe_2O_3$. It is necessary to deduct the quantity of calcium taken up in such compounds or combinations from the quantity supplied by the ores charged to the kiln to determine the amount provided for forming calcium aluminates. The same considerations apply to other constituents which may occur in the charge and which may combine with calcium and/or aluminum or their oxides.

Preferably the mixture charged to the kiln contains calcium and aluminum, reckoned as their oxides, in excess of 50% by weight.

In the following discussion the convenient designation of the oxides is used: CaO=C; $Al_2O_3$=A. (Thus, $3CaO \cdot 5Al_2O_3 = C_3A_5$.)

X-ray diffraction studies indicate that, for an overall molecular ratio of $C_3A_5$, the composition with respect to compounds is, on the basis of some X-ray literature, $C_3A_5$, and, on the basis of other literature, 1 mol of CA and 2 mols of $CA_2$. It has been stated by some that the compound composition for an overall chemical composition of $C_3A_5$ will depend upon the manner of manufacture, the governing parameters being unknown. Microscopic examination of cement manufactured in a rotary kiln 30 feet long, with an internal diameter of 21 inches, at a temperature of 2500° F., having the overall composition $C_3A_5$, although having a melting temperature of 3200° F., "indicate that the entire material never reached a complete melt . . . and that much of the reaction, therefore, occurred in the solid state." (Bernard Erlin, Associate Research Petrographer, Research and Development Laboratories, Portland Cement Association.) Although Dr. Erlin's petrographic and X-ray analysis considers this material to be a mixture of CA and $CA_2$, apparent shifts in the $d$-spacings of normal CA or of $CA_2$ patterns were found, indicating either lattice expansion or contraction, or planes not existing in CA or in $CA_2$. If true, this may reflect differences due to the method of manufacture involving solid-state reactions well below the liquidous temperatures for the compositions burned in the kiln, the burning being under "commercial conditions" rather than under laboratory conditions for the determination of phase equilibria. It is noted, further, that uncalcined alumina and alumina hydrates, as well as calcium carbonate, chalk and calcium hydroxide, have phase transformations well below the temperature of burning in the rotary kiln; for example the calcareous compounds noted dissociate at between 1645° F. for the calcites and as low as 1020° F. for the hydrates of lime. In the rotary kiln the effective corresponding temperatures are about 1800° and 1200° F., respectively, in view of heat losses from the kiln operation and compensation for specific heats and other undetermined endothermic parameters.

For alumina and alumina hydrates, where the ore contains gibbsite, transformation to gamma alumina occurs at 400° to 600° F., while boemite forms gamma alumina at 950° to 1100° F., and alpha alumina at 2200° F. At such transformations there are high-energy exchange rates by virtue of the tendency toward rapid equilibrium with the environment—either toward oxidation, if such is possible, or in the case of oxides, toward solid-state reactions.

It follows that these reactions are possible in a rotary kiln under commercial industrial conditions at a temperature well below 2600° F., especially if the raw materials consist predominantly of hydrated lime and hydrated alumina. Higher temperatures, up to 2800° F., increase the reaction rate and are desirable when the raw materials are of lower purity. It is probable that considerable solid-state reactions are possible if one of the two components of the reaction present in the mixture being burned has reached a high-energy state by virtue of dissociation or of phase transformation.

In rotary-kiln operations performed in proof of this disclosure, calcium carbonate of "Whiting Grade" was utilized as the calcareous component. The aluminous component was, in one case, high-grade powdered alumina (known commercially as "Alcoa A–14"), and in another, South American bauxite (a mixture of alumina hydrates, largely gibbsite and boemite). It was found that in the calcination of calcite the most active or "high-energy form" of CaO is obtained at an optimum temperature of about 1900° F., provided that the material being calcined is adequately fine to preclude the occurrence of unburned cores. This would provide a differential of 700° F. between the point in the kiln where the temperature is 1900° F. and that at which the material reaches 2600° F., the preferred upper temperature limit according to the invention, and a differential of 900° F. to the limit of 2800° F. The time of residence of the charge and of burning within this differential range is the time required for the charge to advance through the kiln from the zone at which it attains 1900° F. to the point of maximum temperature, plus the time in passing from the latter point to the discharge lip of the kiln.

In a rotary-kiln operation using a kiln length of 30 feet, an internal diameter of 21 inches, and a slope of 0.45 inch per foot, wherein the rotation is 1 revolution per minute and the feed rate such as to cause 5 lbs. per minute of calcined calcium aluminate to be dischraged, the total pass time through the kiln is, typically, one and one-quarter hour; for a maximum temperature of 2500° F., the total residence time above 1900° F. is then about 23 minutes (and slightly less above 2000° F.). For a commercial kiln of the type used for Portland cement manufacture, such as one 465 feet in length and 12 feet in internal diameter, discharging at the rate of 1,000 lbs. per minute, and operated at usual kiln speed and with fixed slope, the pass time is known to be about two and one-quarter hours. From available data it can be calculated that if the maximum burning temperature is 2500° F. the residence time above 1900° F. within the kiln is between 20 and 25 minutes. In other words, kiln dimensions, speeds of rotation, and loads are necessarily adjusted to produce the required heat inputs per pound of charge and to provide adequate residence time to insure the required reactions; however, the heat input is limited to that necessary to effect the above-mentioned reactions, not merely as a matter of economy but more importantly to insure the production of a cement of superior quality.

As was previously stated, the maximum temperature is always limited to avoid fusion of the charge, and the melting point of the charge will vary with its composition. In fact, the temperature within the kiln is often such that the charge is considerably below its fusion temperature. Thus, in the exemplary case of a charge having a melting point of 3200° F., it was desirable to use as a maximum temperature 2500° F. Even lower temperatures, down to 2000° F. can be used; however, the reaction rate decreases with decreasing temperatures, so that increased residence times become necessary, making the process uneconomical when the charge is held below 2000° F.

The burned material discharged from the kiln is ground to produce a fine powder. The degree of grinding can be greater than was possible with known high-alumina cements for the reason that the cements produced according to the invention have the characteristic of setting up more slowly. This may be elucidated by the explanation that, within limits, grinding such cements to a greater fineness leads to increased early strength; however, in the prior cements it caused concomitant rapid setting, to the extent that the concrete made therefrom would start to set before placement was possible. This made it necessary to limit the degree of grinding, leading to a failure to develop the potential strength characteristics of the cement, unless costly retarders were used as admixtures. Because the cement produced according to the invention has the unusual property of slow set, it is possible to grind it more finely and to attain or at least to approach more closely the optimum degree of fineness.

One of the observed phenomena of the cement according to the invention is that the paste made by wetting it is highly thixotropic. The advantages of thixotropy are:

(1) By making longer mixing times possible, a substantial reduction in the water-to-cement ratio can be achieved, with consequent substantial increase in the strength of the hardened mortar or concrete by virtue of the lower water-to-cement ratio.

(2) On lengthy hauls in transit mix, after preliminary mixing, agitation of the mortar or concrete may be stopped for as long as an hour. Upon resuming agitation just before discharge from the transport vehicle, the thixotropic property permits facile flow, no strength being lost.

(3) Placement of the mortar or concrete, even if very stiff and even if having low water-to-cement ratio, is easy by the use of vibrators.

The cements prepared by the method according to the invention are more thixotropic than previously known cements, particularly Portland cements and calcium aluminate cements such as those mentioned in the following example as prior art. In fact, it is well known that Portland cement and known high-alumina calcium aluminate cements thicken and work-harden to an extent that any thixotropic properties, if present, are destroyed and cannot be noted.

*Example*

Three cements, identified herein as A, B, and C, were produced by combining "Whiting Grade" calcium carbonate with different aluminous ores as follows: For cement A, one part of calcium carbonate and 1.5 parts of South American bauxite; for cement B, one part of calcium carbonate and 1.83 parts of the same bauxite; and for cement C, one part of calcium carbonate and 1.74 parts of a commercially available alumina known as "Alcoa A-14." All ratios given herein are by weight. The resulting mixtures were passed through the 30-foot rotary kiln previously described under conditions of temperature and flow rates as stated, i.e., to attain a maximum temperature of 2500° F. and a residence time above 1900° F. of 23 minutes. The calcined products were ground to produce fine powders. The compositions of the three mixtures are evident from Table I, which gives the compositions of the raw materials and of the three cements produced from the three mixtures:

and the iron with about an additional 0.6% if tetracalcium alumino ferrite was formed. The net amount of CaO available for forming calcium aluminate was, under such conditions, therefore reduced from 35.3% to approximately 25.5%, and the ratio of CaO to $Al_2O_3$ in the calcium aluminate formed by the burning was approximately 1:2.22 by weight. By applying the same procedure to the several cements, the ratios by weight of calcium oxide to alumina in the three cements are, therefore, approximately: 0.45 for cement A, 0.34 for cement B, and 0.32 for cement C.

The cements A, B, and C were ground to the fineness shown in Table II (wherein two portions of cement C are shown, ground to different degrees of fineness). Fineness is given as square centimeters per gram of cement, as determined by the method of test specified in A.S.T.M. Method C-204-55. The ground cements were used as the cementing ingredients of test mortar cubes containing 1 part of cement to 2.75 parts by weight of graded Ottawa sand, prepared in accordance with the method of test specified in A.S.T.M. Method C-109-58. The water-to-cement ratios are shown in column 2 of the table. Different cubes were tested after different ages as indicated.

*Table II.—Compressive strengths of 2-inch mortar cubes*

| Cement | Fineness | W/C Ratio | 1-day | 3-day | 7-day | 14-day | 28-day | 90-day |
|---|---|---|---|---|---|---|---|---|
| A | 3,480 | 0.48 | 6,750 | 8,380 | 9,000 | 9,340 | 10,420 | 10,680 |
| B | 3,980 | 0.48 | 9,480 | 11,700 | 14,350 | 16,025 | 15,080 | 17,700 |
| C | 4,090 | 0.50 | 5,670 | 9,568 | 1,1570 | 11,000 | 11,200 | 10,750 |
| C | 5,560 | 0.46 | 10,500 | 14,700 | 15,800 | 15,600 | 15,400 | 17,550 |
| (1) | 2,960 | 0.49 | 5,480 | 6,460 | 7,330 | 7,620 | 8,100 | 8,850 |
| (2) | 9,760 | 0.47 | 2,550 | 4,620 | 5,840 | 6,330 | 6,200 | 6,600 |

Strengths given in the last six columns of Table II are in lbs. per sq. inch. They show extremely high early strengths. The cements produced according to the invention are, therefore, eminently suitable for various applications wherein the hardened mass must attain high strength within a short time after placement.

The fineness of 5560, given for the second example of cement C, is approximately the optimum fineness for this cement.

For purposes of comparison, two commercially available high-alumina cements were similarly incorporated in mortar cubes by the same procedures and similarly tested. The cement (1) was a commercial refractory cement known as "Lumnite." The cement (2) was a commercial "castable" calcium aluminate cement produced in an electric hearth by the Aluminum Company of America, known as "CA-25," containing CaO and $Al_2O_3$ in the weight ratio of about 2:5.

*Table I.—Chemical compositions of raw materials and of calcium aluminate cements*

[Percentages by weight]

| Oxides | Oxide Composition of raw Materials | | | Calcium Aluminate Cements Burned to 2,500° F. | | |
|---|---|---|---|---|---|---|
| | Commercial "Whiting grade" calcium carbonate | South American bauxite | Alcoa A-14 alumina | A | B | C |
| $SiO_2$ | 0.48 | 3.13 | | 3.3 | 3.5 | 0.5 |
| $Fe_2O_3$ | 0.15 | 1.90 | | 1.9 | 2.0 | 0.0 |
| $Al_2O_3$ | 0.18 | 59.23 | 99.40 | 56.6 | 60.5 | 74.3 |
| CaO | 55.20 | 0.25 | | 35.3 | 31.0 | 25.2 |
| MgO | 0.54 | 0.11 | | 0.4 | 0.4 | 0.2 |
| $TiO_2$ | 0.00 | 1.54 | | 1.5 | 1.6 | 0.0 |
| $Na_2O$ | 0.00 | | | | | 0.0 |
| $K_2O$ | 0.00 | | | | | 0.0 |
| Alkalies and undetermined | | 1.04 | 0.50 | 1.0 | 1.1 | 0.0 |
| Loss on ignition, 1850° F | 43.45 | 32.79 | 0.10 | | | |
| Acid-insoluble residue 1:3 HCl | | | | 6.1 | 8.6 | 16.4 |

It should be noted that the quantities of $Al_2O_3$ and CaO given in the last three columns of Table I do not show directly the ratio of these oxides in the calcium aluminate formed during burning because a part of the calcium oxide combined with silica and with iron oxide. For example, in cement A, if tricalcium silicate was formed, the silica combined with about 9.2% of the CaO, The melting temperatures of these cements were as given in Table III:

*Table III.—Melting temperatures*

| Cement: | Melting temperature, °F. |
|---|---|
| A | 2,670 |
| B | 2,720 |
| C | 3,150 |
| (1) | 2,620 |
| (2) | 3,150 |
| (2A) | 2,950 |

The cement identified as (2A) was cement (2) after removal of the coarse alumina constituents by sieving.

Cements B and C were further tested as the cementing ingredients of concretes. In one series of tests they were mixed with a natural gravel from Fair Oaks, California; in the other, cement C was mixed with a commercial high-refractory aggregate known as "Periclase," manufactured by the Kaiser Chemical and Aluminum Corporation, at Moss Landing, California. The wet concretes were mixed and cast into standard test cylinders 3 inches in diameter and 6 inches in height. The mixing conditions and properties of the cured concretes are shown in Table IV, wherein: The water-to-cement ratio in the third column is on a weight basis; the unit weight gives the weight in lbs. per cubic foot; and the cement factor is the number of 94-lb. sacks of cement per cubic yard of concrete. The slump of the wet concretes are not reported because they were indeterminate due to the highly thixotropic properties of these cements. The test cylinders were cured in a foggy atmosphere and tested for strength after various ages. The strengths, shown in Table IV, are expressed in lbs. per sq. inch.

structure must exhibit its structural characteristics soon after emplacement.

The concretes described in Table IV had excellent resistance to a direct flame applied by a torch. This makes the cements eminently suited to applications wherein the concrete is exposed to high temperatures.

I claim as my invention:

1. The method of manufacturing cement consisting essentially of calcium aluminates which contain CaO and $Al_2O_3$ in the molecular ratio of from about 1:1.1 to 3:5, which comprises the steps of:
   (a) passing an intimate mixture of calcareous and aluminous materials containing at most 3% by weight of phosphates, reckoned as $R_2O_5$, in proportions to yield calcium oxide and alumina in the weight ratio between 0.5 and 0.3 for forming calcium aluminate, through a rotary kiln,
   (b) passing a flame through said kiln and thereby heating said mixture therein to a temperature between 2000° and 2800° F., said flame being controlled to avoid heating said mixture to above the fusion temperature thereof,
   (c) controlling the rate of throughput of said mixture through the kiln to attain a residence time therein between one and two and one-half hours and between ten and sixty minutes above a temperature of 1900° F., and
   (d) grinding the material discharged from the kiln to produce a powder.

2. The method as defined in claim 1 wherein the quantities of calcium and aluminum, reckoned as their oxides, in said mixture exceeds 50% by weight.

*Table IV.—Compressive strengths of 3 x 6 inch concrete cylinders*

| Cement | Aggregate | W/C ratio | Unit wt. | Cement factor | 1-day | 3-day | 7-day |
|---|---|---|---|---|---|---|---|
| B | Fair Oaks | 0.34 | 156 | 7.24 | 7,470 | 8,830 | 9,430 |
| C | do | 0.34 | 154 | 7.03 | 6,026 | 7,750 | 8,130 |
| C | Periclase | 0.49 | 174 | 7.08 | 7,260 | 10,700 | 14,700 |

The extremely high early strengths of the cement produced by the method according to the invention are evident, making them suitable for applications wherein a 3. The method as defined in claim 1 wherein said aluminous material contains over 95% by weight of aluminum, reckoned as $Al_2O_3$.

References Cited by the Examiner

UNITED STATES PATENTS 1,142,989   6/1915   Spackman _____ 106—104

FOREIGN PATENTS 1,092,720   11/1954   France.
250,246   6/1927   Great Britain.
265,494   2/1927   Great Britain.

TOBIAS E. LEVOW, *Primary Examiner.*

H. McCARTHY, S. E. MOTT, *Assistant Examiners.*